United States Patent [19]
Gellert

[11] 4,043,740
[45] Aug. 23, 1977

[54] INJECTION MOLDING NOZZLE SEAL

[76] Inventor: Jobst Ulrich Gellert, 11 Newton Road, Brampton, Ontario, Canada

[21] Appl. No.: 695,659

[22] Filed: June 14, 1976

[30] Foreign Application Priority Data
Mar. 25, 1976 Canada .................................. 248836

[51] Int. Cl.² ............................................ B29F 1/03
[52] U.S. Cl. .................................. 425/567; 425/548; 425/566; 425/DIG. 227
[58] Field of Search ............... 425/242 R, 243, 245 R, 425/245 NS, 247, DIG. 224, 227

[56] References Cited
U.S. PATENT DOCUMENTS

| | | | |
|---|---|---|---|
| 2,878,515 | 3/1959 | Strauss | 425/245 X |
| 3,037,245 | 6/1962 | Darnell | 425/245 X |
| 3,231,938 | 2/1966 | Seymour | 425/245 X |
| 3,677,682 | 7/1972 | Putkowski | 425/243 X |
| 4,004,871 | 1/1977 | Hardy | 425/243 |

FOREIGN PATENT DOCUMENTS 77,306  10/1970  Germany .............................. 425/243

*Primary Examiner*—Francis S. Husar
*Assistant Examiner*—William R. Briggs

*Attorney, Agent, or Firm*—George H. Riches & Associates

[57] ABSTRACT

This invention relates to a nozzle seal to be used in multi-cavity valve-gated injection molding. A heater cast with a lower nozzle portion is spaced from a cavity plate by an insulating air space and the valve pin reciprocates vertically in the heater cast bore into a gate in the cavity plate. A hollow generally cylindrical nozzle seal is provided across the air space between the lower tip of the nozzle portion and the cavity plate around the gate. The cylindrical seal provides additional heat transfer from the heater to the area of the gate to facilitate operation of the valve pin, particularly seating of the valve pin in the gate, during molding of certain plastic materials with high temperature characteristics. The nozzle seal is formed of a high yield strength titanium alloy and structured to avoid leakage or breakage in this critical area due to high injection pressure and both vertical and lateral relative movement between the nozzle and the cavity plate due to thermal expansion and contraction. In a second embodiment, a lower portion of the seal is tapered to improve sealing at high pressures and heat transfer to the immediate gate area and to avoid a "dead spot" for the accumulation of molten plastic material adjacent the gate.

6 Claims, 3 Drawing Figures

INJECTION MOLDING NOZZLE SEAL

BACKGROUND OF THE INVENTION

This invention relates to multi-cavity valve-gated injection molding, and more particularly to a nozzle seal to be used in the same.

In a typical multi-cavity arrangement, a number of heaters are geometrically spaced from the molding machine and the molten plastic material or melt flows from the molding machine through radially extending hot runner passages, down through the heater casts, past the valve pins and into the cavities. The lower tip of each valve pin is forcibly seated in a gate in the respective cavity plate and, as is well known in the art, the most critical operation of the mechanism is in the gate area where malfunctions may cause costly shut-downs of the machine or imperfections in the molded product. The lower nozzle portion of the heater cast is separated from the cavity plate by an air space which provides thermal insulation between the hot nozzle and the cooler cavity plate. In the past, this air space has at least partially filled with plastic material which similarly serves as an insulator. In molding products where space between cavities is not a problem, a locating bushing is used to locate the nozzle portion of the heater cast relative to the cavity plate to prevent lateral movement therebetween due to thermal expansion and contraction. However, in certain applications where the heater cast has several nozzles protruding from it and it is necessary to arrange the gates as close together as possible, it is desirable to replace the locating bushings by smaller insulation bushings and allow for lateral and vertical movement of the nozzle portion in the air space relative to the cavity plate due to thermal expansion and contraction.

However, it has been found that in molding certain plastic materials with high temperature characteristics such as nylon, polycarbonate, ABS, and acrylic, the valve pin does not always operate satisfactorily and particularly the tip of the valve pin does not seat satisfactorily in the gate. Not only is this troublesome and costly in itself, but it has the effect of requiring greater seating pressure on the valve pin, thereby placing greater stress on the valve pin operating mechanism which decreases the expected operating life of the mechanism as a result of increased water. It has been found that these problems may be substantially reduced by providing for increase heat transfer to the immediate gate area, while avoiding the problem of relative movement between the lower nozzle portion of the heater cast and the cavity plate due to thermal expansion and contraction.

SUMMARY OF THE INVENTION

Accordingly, it is an object of the present invention to at least partially overcome these disadvantages by providing a generally cylindrical nozzle seal which extends between the nozzle portion of the heater and the gate area of the cavity plate.

To this end, in one of its aspects, the invention provides an injection molding valve-gated mechanism having a vertical valve pin which reciprocates in a bore in a heater cast located in a cavity plate to control flow of molten plastic from a molding machine to a cavity, the heater cast having a lower nozzle portion which is separated from the adjoining cavity plate by an air space and through which a valve pin projects to provide a valve in a gate in the cavity plate to a cavity adjacent the lower tip of the nozzle portion of the heater cast, the improvement wherein a hollow generally cylindrical seal having an upper and a lower portion and a central bore is received in the nozzle portion of the heater cast coaxially with the bore thereof to project downwardly therefrom substantially to the cavity plate, whereby the bore of the seal extends between the bore of the heater cast and the gate in the cavity plate.

Further objects and advantages of the invention will appear from the following description taken together with the accompanying drawings.

DETAILED DESCRIPTION OF THE DRAWINGS

Figure 1:
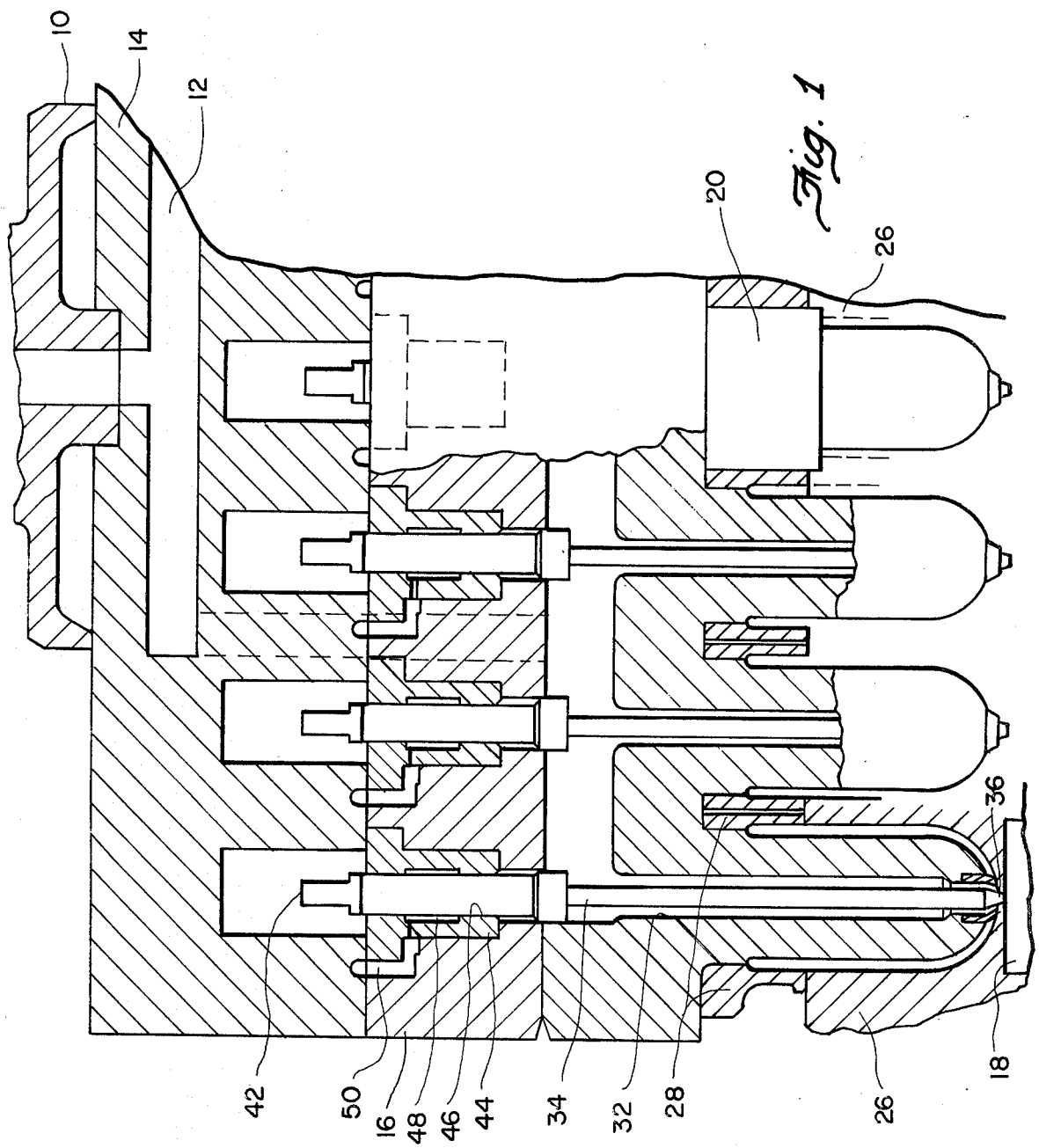
FIG. 1 is a partial sectional view of a portion of a multi-cavity valve-gated injection molding mechanism showing the nozzle seal according to the invention.

Reference is first made to FIG. 1 which shows a locating ring 10 which is positioned beneath a molding machine (not shown) to receive molten plastic material which is injected through radial hot runner passage 12 in manifold spreader plate 14 and the heater cast 16 into the cavity 18. The mechanism is centrally located by lateral positioning bushing 20, being seated in the cavity plate 26. The heater cast, 16 is supported above the cavity plate 26 by insulation bushings 28 and heated by an electrical heater element (not shown). The insulation bushings 28 are relatively thin to allow minimum spacing between cavities. They are not seated in the surface of the cavity plate 26, and accordingly "slide" over the surface allowing the heater cast to move laterally outward from the center relative to the cavity plate due to thermal expansion and contraction. The heater cast 16 has vertical cylindrical bores 32 through each of which extends a valve pin 34 having a frusto-conical tip 36. The valve pin 34 is vertically reciprocated by a piston operated rocker arm (not shown) which is in bearing contact with the peak 42 of the valve pin. The valve pin 34 passes through a bushing seal 44 which is seated in the heater cast 16. The bushing seal 44 has a bore 46 which is in alignment with the bore 32 of the heater cast and which is interrupted by a circumferential opening 48 which is vented to atmosphere through vent passage 50.

Figure 2:
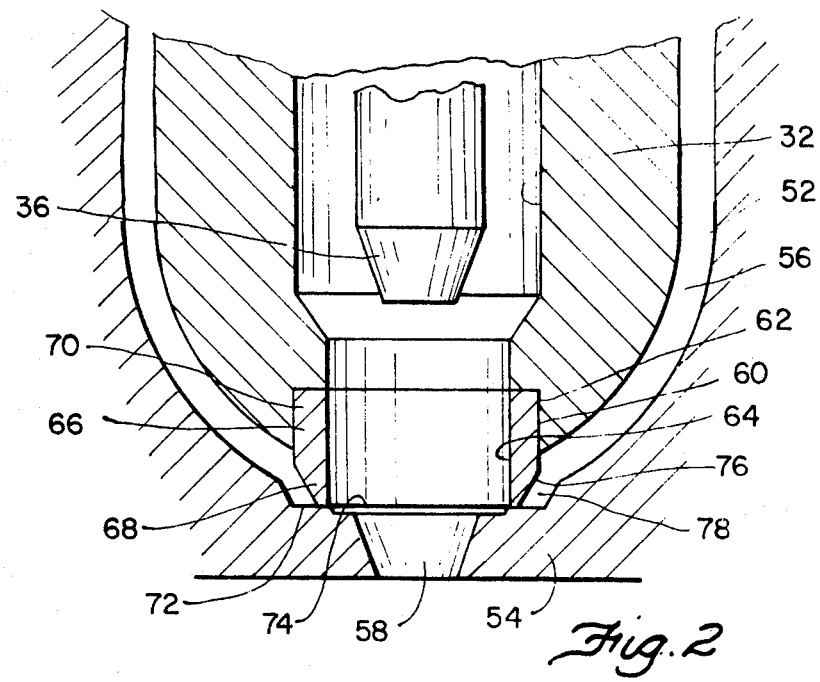
FIG. 2 is a more detailed sectional view of a portion of the mechanism seen in FIG. 1, showing the nozzle seal according to a first embodiment of the invention.

Reference is now made to more detailed FIG. 2 which shows a lower nozzle portion 52 of the heater cast 16 separated from the cooler cavity plate 54 by air space 56. The frustoconical tip 36 of the valve pin 34 is shown (in the open position) positioned in the heater bore 32 above gate 58 in the cavity plate 54 leading to the cavity 18.

A hollow generally cylindrical nozzle seal 60 extends from the lower tip 62 of the nozzle portion 52 of the heater cast 16 across air space 56 to abut on the cavity plate 54. The nozzle seal 60 has an inner bore 64 which is in alignment with the bore 32 of the heater cast at that point, and through which the tip 36 of the valve pin 34 extends to be received in the gate 58 in the cavity plate 54, in the closed position. The nozzle seal 60 has an upper portion 66 and a lower portion 68. The upper portion 66 of the nozzle seal is securely received in a cylindrical recess 70 in the nozzle portion 52 of the heater cast 16, and the lower portion 68 of the nozzle seal is received in an annular seat 72 which extends around the gate 58 in the cavity plate 54. The annular seat 72 has an upper horizontal face 74 and the mechanism is dimensioned such that the lower portion 68 of the nozzle seal 60 is slightly spaced from the horizontal face 74 following assembly when the mechanism is cool, but is brought into bearing contact with the horizontal face 74 during use by downward thermal expansion of the mechanism in the order of 0.010 inches when it reaches temperatures in the range of 5–600° F. The lower portion 68 of the nozzle seal 60 has a bevelled outer rim 76 and the annular seat 72 has a matching tapered outer wall 78. As shown in the operating (hot) position in FIG. 2, the bevelled outer rim 76 of the nozzle seal 60 is spaced from the outer wall 78 of the annular seat 72 with sufficient tolerance to allow for lateral movement of the nozzle seal of the order of 0.050 inches per inch from the central axis of the seat plate 10 due to thermal expansion of the mechanism during use. The heater cast 16 is machined at room temperature with dimensions to allow for lateral and vertical expansion at a predetermined operating temperature to the position shown in FIG. 2. The lateral expansion may be substantial eg. in the embodiment shown in FIG. 2 in the room temperature position the nozzle seal 60 would be spaced slightly upward and approximately 1/32 inches to the right of the position shown. In the expanded position shown, the nozzle seal 60 is centrally located over the gate 58 and seats securely against the face 74 of annular seat 72 to prevent leakage of the melt due to the high injection pressure to which it is subjected.

In use, the injection pressure of the molten plastic material from the molding machine lifts the valve pin 34 upward and opens the gate 58, allowing the molten plastic material to flow into the cavity. The valve pin 34 is then forced downwardly by the rocker arm 38 to a position in which the lower tip 36 of the valve pin 34 is seated in the gate 58 to seal the gate while the molded product is removed from the cavity. This high pressure and temperature operation is at a high frequency to provide satisfactory production. Heat is conducted from the heater element downward through the nozzle portion 52 of the heater cast 16 which is formed of a berylium copper alloy to the tip 62 and also downward from the melt through the valve pin 34. The cavity plate 54 through which the gate 58 extends is, of course, cooled by conventional means. While the valve pin 34 conducts heat directly to the area of the gate 58 in the closed position, it does not provide any heat to this area in the open position and particularly in the instant immediately prior to closing. However, the nozzle seal conducts additional heat from the tip 62 of the heater cast 16 to the immediate area of the gate 58 and this heat serves to eliminate or reduce solidification of the melt in the gate area prior to closing. This greatly facilitates seating of the valve pin tip 36 in the gate 58, allowing lesser seating pressures to be used which reduces wear and extends the operating life of the mechanism. This is particularly advantageous when molding materials with high temperature characteristics, such as those mentioned above. The nozzle seal 60 is formed of a high titanium alloy which provides the high yield strength which is necessary to enable the seal to be located in this critical area without encountering frequent breakage due to sliding bearing contact with the cavity plate 54 resulting from thermal contraction and expansion of the heater cast 16 and cyclical high injection pressures.

Figure 3:
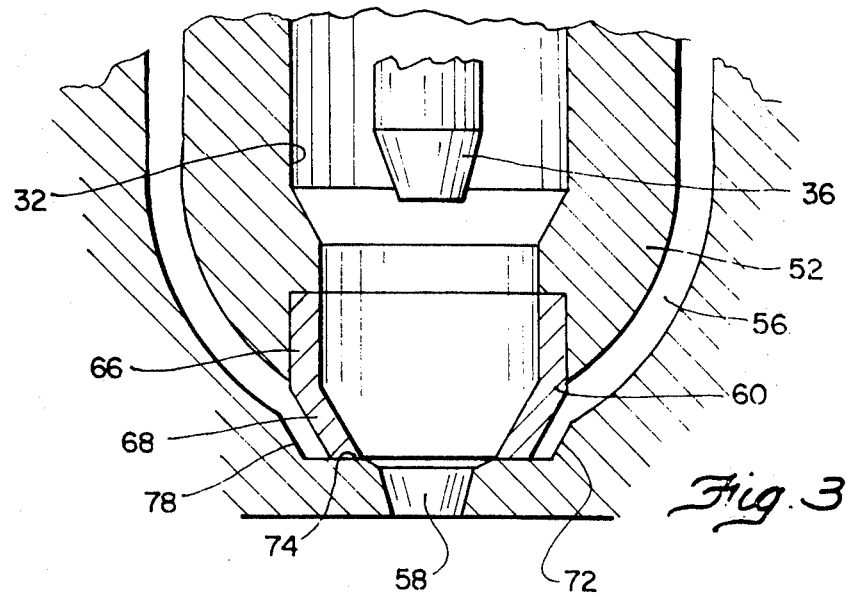
FIG. 3 is a sectional view similar to FIG. 2, showing the nozzle seal according to a second embodiment of the invention.

The second embodiment shown in FIG. 3 is similar to the first embodiment and accordingly features common to both are described and illustrated using the same reference numerals. In this embodiment, the whole lower portion 68 of the nozzle seal 60 is tapered inwardly. As was the case in the first embodiment, sufficient space is provided between the tapered lower portion 68 of the nozzle seal 60 and the horizontal face 74 and tapered outer wall 78 of the annular seat 72 to allow for thermal expansion and contraction of the heater cast 16.

In use, this second embodiment has the advantage that the tapered lower portion 68 of the nozzle seal 60 provides additional heat transfer to the area of the gate 58 in that it does not have a reduced cross section and it extends closer to the gate and as well avoids a substantial "dead spot" for the accumulation of molten plastic material adjacent the gate 58. In addition, the inwardly tapered configuration of the lower portion 68 of the nozzle seal is slightly resilient in the event there is increased downward thermal expansion due to the design temperature being exceeded on occasion. Furthermore, the injection pressure of the melt exerts an outward force on the tapered lower portion, thereby improving the seal against the horizontal face 74 of the annular seat 72 in the cavity plate 54. Otherwise, the operation is substantially the same as that of the first embodiment, and the description need not be repeated.

Although the description of the nozzle seal according to the invention has been given with respect to two particular embodiments, it is not to be construed in a limiting sense. Other variations and modifications will occur to those skilled in the art. For a definition of the invention, reference is made to the appended claims.

What I claimed is:

1. In an injection molding valve-gated mechanism having a vertical valve pin which reciprocates in a bore in a heater cast located in a cavity plate to control flow of molten plastic from a molding machine to a cavity, the heater cast having a lower nozzle portion which is separated from the adjoining cavity plate by an air space and through which a valve pin projects to provide a valve in a gate in the cavity plate to a cavity adjacent the lower tip of the nozzle portion of the heater cast, the improvement wherein a hollow generally cylindrical thermally conductive metallic seal having an upper and a lower portion and a central bore is received in a radially inwardly open cylindrical recess provided in the bore of the nozzle portion of the heater cast, said recess being open axially downwardly and sized to snugly receive said seal so that the surface of the bore of said seal and the axially adjacent surface of the nozzle bore are contiguous, said seal projecting downwardly across the air space and having a horizontal surface received in bearing contact with an annular seat provided on said cavity plate upon vertical thermal expansion of the heater cast.

2. Mechanism as claimed in claim 1 wherein the seat in the cavity plate has an outer wall which is spaced from the seal to provide sufficient tolerance to allow for lateral movement of the seal relative to the cavity plate due to thermal expansion and contraction.

3. Mechanism as claimed in claim 2 wherein the outer wall of the seat is tapered outwardly upward and the lower portion of the seal has an outer rim which is bevelled at a corresponding angle.

4. Mechanism as claimed in claim 2 wherein the lower portion of the seal is tapered downwardly inward.

5. Mechanism as claimed in claim 4 wherein the outer wall of the seat is tapered outwardly upward at an angle corresponding to the taper angle of the lower portion of the seal.

6. Mechanism as claimed in claim 1 wherein the seal is formed of a titanium alloy.

* * * * *